(12) United States Patent
Le Cornec

(10) Patent No.: US 6,690,834 B1
(45) Date of Patent: Feb. 10, 2004

(54) COMPRESSION OF PIXEL DATA

(75) Inventor: Yann Le Cornec, Fremont, CA (US)

(73) Assignee: Sigma Designs, Inc., Milpitas, CA (US)

( * ) Notice: Subject to any disclaimer, the term of this patent is extended or adjusted under 35 U.S.C. 154(b) by 0 days.

(21) Appl. No.: 09/235,937

(22) Filed: Jan. 22, 1999

(51) Int. Cl.$^7$ ................................................ G06K 9/36
(52) U.S. Cl. ....................................... 382/236; 382/251
(58) Field of Search ................................ 382/232, 233, 382/236, 244–247, 251–253, 250; 325/240.03, 242, 243–246; 348/27

(56) References Cited

U.S. PATENT DOCUMENTS

| | | | |
|---|---|---|---|
| 4,562,305 A | 12/1985 | Gaffney | 713/190 |
| 4,675,612 A | 6/1987 | Adams et al. | 327/142 |
| 4,713,621 A | 12/1987 | Nakamura et al. | 327/152 |
| 4,823,260 A | 4/1989 | Imel et al. | 712/222 |
| 4,876,660 A | 10/1989 | Owen et al. | 708/603 |
| 5,142,380 A | 8/1992 | Sakagami et al. | 358/432 |
| 5,191,548 A | 3/1993 | Balkanski et al. | 708/402 |
| 5,196,946 A | 3/1993 | Balkanski et al. | 358/433 |
| 5,218,431 A | 6/1993 | Gleicher et al. | 348/472 |
| 5,253,078 A | 10/1993 | Balkanski et al. | 358/426 |
| 5,270,832 A | 12/1993 | Balkanski et al. | 358/432 |
| 5,341,318 A | 8/1994 | Balkanski et al. | 708/402 |
| 5,379,356 A | 1/1995 | Purcell et al. | 382/233 |
| 5,528,309 A | 6/1996 | Nguyen | 348/587 |
| 5,574,572 A | 11/1996 | Malinowski et al. | 358/451 |
| 5,612,743 A * | 3/1997 | Lee | 348/409 |
| 5,638,130 A | 6/1997 | Linzer | 348/445 |
| 5,650,824 A | 7/1997 | Huang | 348/453 |
| 5,719,511 A | 2/1998 | Le Cornec et al. | 327/146 |
| 5,790,881 A | 8/1998 | Nguyen | 712/34 |
| 5,832,120 A | 11/1998 | Prabhakar et al. | 382/233 |
| 5,844,617 A | 12/1998 | Faroudja et al. | 348/441 |
| 5,867,601 A * | 2/1999 | Phillips | 382/233 |
| 5,982,459 A | 11/1999 | Fandrianto et al. | 348/845.2 |
| 6,084,909 A | 7/2000 | Chiang et al. | 375/240.03 |
| 6,184,936 B1 | 2/2001 | Hu | 348/453 |
| 6,205,255 B1 * | 3/2001 | Mak | 382/245 |
| 6,275,263 B1 | 8/2001 | Hu | 348/441 |
| 6,412,024 B1 | 6/2002 | Hsu et al. | 710/5 |
| 6,421,096 B1 | 7/2002 | Nguyen | 348/587 |
| 6,427,203 B1 | 7/2002 | Le Cornec | 712/35 |
| 6,448,825 B1 | 9/2002 | Le Cornec et al. | 327/141 |
| 6,501,512 B2 | 12/2002 | Nguyen et al. | 348/592 |
| 2002/0075411 A1 | 6/2002 | Nguyen | 348/587 |

FOREIGN PATENT DOCUMENTS

WO     WO 9210911 A     6/1992

OTHER PUBLICATIONS

Greg Pastrick. "Full Motion Video: ReelMagic Points to a Future of Fast, Full–Screen Film Clips". Feb. 8, 1994. PC Magazine.

Tsai Y T: "Color Image Compression for Single–Chip Cameras" IEEE Transactions on Electron Devices, vol. 38, No. 5, May 1, 1991, pp. 1226–1232, XP000200683, see abstract; figures 1, 6.

\* cited by examiner

*Primary Examiner*—Jose L. Couso
*Assistant Examiner*—Duy M. Dang
(74) *Attorney, Agent, or Firm*—Swernofsky Law Group PC

(57) ABSTRACT

This invention provides a method of pixel data compression in which sets of adjacent pixels are compressed in a manner which is sometimes lossy but which reserves the greatest loss of accuracy for circumstances where loss is masked by high frequency components of the original pixel data.

40 Claims, 2 Drawing Sheets

COMPRESSION OF PIXEL DATA

BACKGROUND OF THE INVENTION

1. Field of the Invention

This invention relates to the compression of pixel data.

2. Related Art

In picture processing applications, particularly video display applications such as those that use one or more standards defined by the Motion Picture Group (MPEG). The amount of memory space required to display and process picture data can be quite large, and can sometimes exceed the capability of the processing entity, commonly a graphics processor in a computer.

As an example, when utilizing the MPEG 2 standard method of processing motion picture data in the PAL format, the amount of picture data which must be stored per frame can be as much as approximately 2.5 megabytes of raw data. Without compression, this image would require five 256 K×16 bit memory chips for display. However, using a compression algorithm, the same 2.5 megabyte image can be stored in 2.0 megabytes or less, requiring only four memory chips instead of five. This reduction in memory requirements translates into real cost savings when considering engineering design time, component costs, and the physical space needed for more memory devices and associated control circuits. Thus, it is desirable to reduce the amount of memory space required for storing and displaying pixel data.

One method that is sometimes used in other picture processing contexts is to compress the picture data, that is to rewrite the data in another format, which requires less memory space. There are two types of compression, lossless and lossy. In lossless compression, the entire amount of information can be recovered from the compressed data; whereas in lossy compression, the process of compression loses some information.

Lossless compression would have the advantage of preserving the original pixel data and allowing that information to be recovered from the compressed data. However, known methods of lossless compression, such as the Liv-Zempel compression algorithm, may record individual pixels in fewer or more bits than in the original pixel data, and thus do not preserve the relative locations of pixels in memory. Thus, it can be difficult to identify the pixel data associated with a particular selected pixel.

Known methods of lossy compression suffer from the drawback that information which is lost is occasionally apparent to a viewer, resulting in a degraded display of the video data on the screen. The visual fidelity of the displayed picture width respect to the original image is then lower than desired.

It would be advantageous to provide a method of compressing pixel data in which the compressed pixel data has a high degree of fidelity with the original pixel data, and in which data associated with each pixel of information in a video display can be quickly and easily located i.e. randomly accessed quickly and with the minimum logic. It would also be advantageous to provide a method of compressing data which upon decompression is scalable and capable of being displayed in multiple environments such as TV, PC, or PDA environments.

SUMMARY OF THE INVENTION

The invention provides a method and system for pixel data compression in which sets of adjacent pixels are compressed as a block, in a manner, which is sometimes lossy and sometimes lossless. When lossy, the greatest loss in fidelity between the original and the compressed pixels is almost entirely reserved for circumstances where the loss is masked by the high-frequency components of the video data, resulting in a display which is indistinguishable from the original picture.

This invention is not format restricted, and can be used with other video signal formats such as SECAM, NTSC, etc. Depending on the video format being used, there are generally several pixel values which when used together, make up the pixel represented on the display screen. For a pixel R, there might be three bytes of data, each representing a degree of color, one for red, one for green, and one for blue. When choosing the values to be compared in the extant method, data representing common pixel attributes are compared and compressed together. For instance, in pixels $R_1$ through $R_4$, each represented by pixel values 1 through 3, pixel values $R_{11}$, $R_{21}$, $R_{31}$ and $R_{41}$ would be compared for similarity. Next, pixel values $R_{12}$, $R_{22}$, $R_{32}$, and $R_{42}$ might be compared, and so on.

The plurality of pixel values in the block are reformatted using a technique in which a first pixel value is represented as an approximate absolute value, and a set of dependent pixel values are represented as approximate relative differences in value. In cases where the relative differences are small or zero, the compression is completely lossless. In cases where the relative differences are larger, the formatting of the first pixel value is responsive to the degree of lossiness required to encode all of the pixels in the memory space allotted.

In a preferred embodiment, the first pixel value and the corresponding dependent pixel relative differences are compressed to a sufficient degree that the resulting compressed values fit within the available memory space.

DETAILED DESCRIPTION OF THE PREFERRED EMBODIMENT

In the following description, a preferred embodiment of the invention is described with regard to preferred process steps and data structures. Those skilled in the art would recognize after perusal of this application that embodiments of the invention can be implemented using DSP circuits adapted to particular process steps and data structures described herein, and that implementation of the process steps and data structures described herein would not require undue experimentation or further invention.

In a memory space for processing picture data, a frame comprises a plurality of horizontal lines, and each horizontal line comprises a plurality of pixels. For instance, one RGB display format in common use comprises 640×480 pixels, with each pixel represented with three pixel values (red, green, blue).

Figure 1:
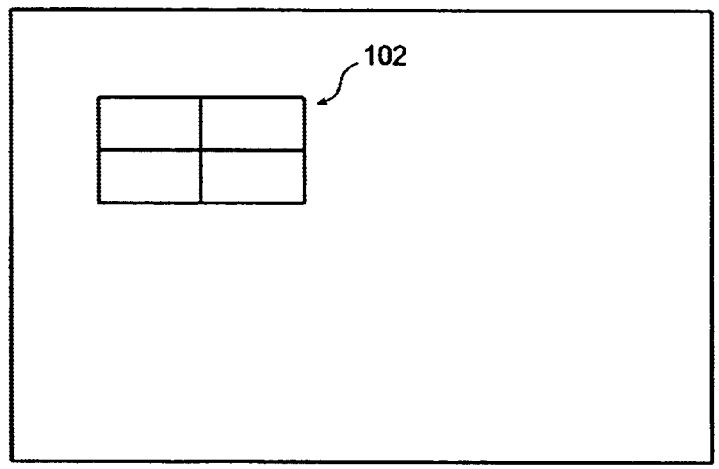
FIG. 1 shows a memory diagram of one choice of a set of four adjacent pixels selected from an entire frame of pixels.

FIG. 1 shows one embodiment of a pixel group 102 consisting of a set of four pixels selected from an entire frame 100 of pixels.

In an uncompressed format, a set of four pixels, each represented by three pixel values would require twelve eight-bit bytes of memory for storage. However, in a compressed format such as that described herein, each set of four pixel values (32 bits total) is reformatted as a unit and requires only three eight-bit bytes (24 bits total) for storage. Thus, four pixels which previously used twelve bytes for storage now on average requires eight, a 25% decrease in storage requirements. Reformatted units of pixel values will be termed a "codeword" for the purposes of this specification.

Figure 2:
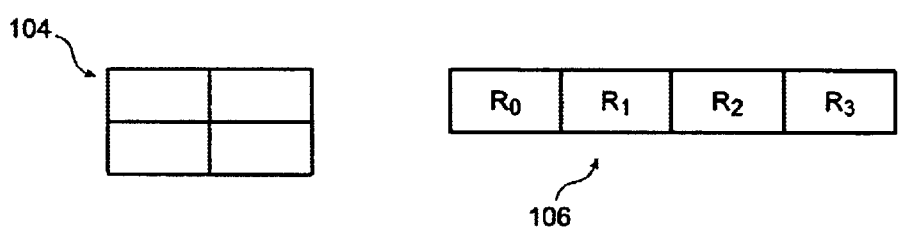
FIG. 2 shows two different sets of four adjacent pixels with different dependencies between pixels.

FIG. 2 shows two different arrangements of pixels. Pixel grouping 104 depicts four pixels chosen such that each pixel is immediately adjacent to all other pixels in its group, whether diagonally, horizontally, or vertically. Pixel grouping 106 depicts four pixels which are linearly arranged such that each successive pixel is adjacent to and linearly arranged with the previous pixel. Although any of the pixel relationships shown would be acceptable for this algorithm, grouping 104 provides the best arrangement of primary and dependent pixels because pixels $R_1$, $R_2$, and $R_3$ are likely to contain information which has a high degree of similarity to one another and pixel $R_0$ due to their relative closeness to one another in the frame.

Should the location of $R_0$ be such that $R_1$, $R_2$, or $R_3$ would fall outside the display area, the difference values associated with those pixels would be assigned a value of zero. For example, if $R_2$ and $R_3$ fall outside the viewing area, $Diff_{12}=R_1-R_2$ is set to zero, and $DIFF_{23}=R_2-R_3$ is set to zero. This situation will never occur when using data decoded from MPEG standards, since the block size for MPEG data is 16×16, resulting in a block which is always evenly divisible by 4. In this case, four 4-pixel groups will always be available.

Figure 3:
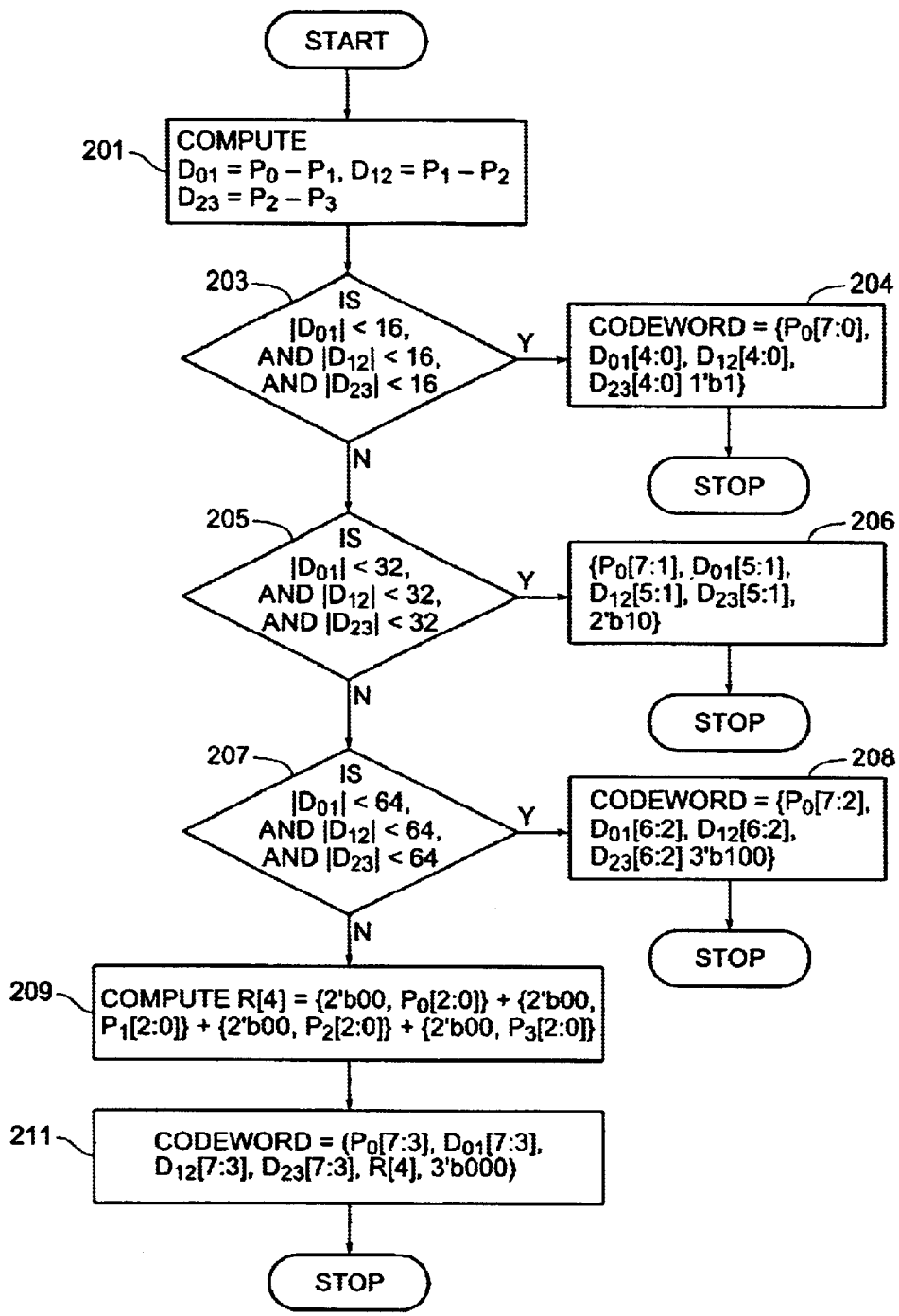
FIG. 3 is a flow chart of a pixel data compression algorithm.

Pixel value $P_0$, chosen from pixel $R_0$, might represent a saturation for a particular hue, perhaps red, as seen in an RGB format, or a value representing a luminance or chrominance value(such as a Y value, a Cr value, or a Cb value), as seen in a YUV format. Similarly, pixel values $P_1$, $P_2$, and $P_3$, might represent the saturation level for the color red for pixels $R_1$, $R_2$, and $R_3$. Referring to the flow chart depicted in FIG. 3, the process begins at block 201 where the difference between pixel values is computed in order to determine their relative similarity. Next, at a block 203 the resulting data is examined to decided if the absolute value of the difference between them is less than 16. If so, a block 204 generates the codeword using pixel value $P_0$ and the four least significant bits of the difference between values $P_0$ and $P_1$, $P_1$ and $P_2$, $P_2$ and $P_3$, followed by a tag comprising a trailing tag bit "1". It is the location of this tag bit "1", in bit position "0", "1", "2", or "3", that tells a restoration technique which method was used in constructing the codeword so that the proper restoration steps may be used.

If, at the block 203, the resulting differences are greater than 16, the method then examines the three most significant bits. This is accomplished, as shown at a block 205, when the differences between the pixel values are examined to decide if they are less than 32. If so, the codeword is generated, in a block 206, as the seven most significant bits of the base value $P_0$ and $P_1$, $P_1$ and $P_2$, $P_2$ and $P_3$, followed by two trailing tags bits "10".

If, in block 205, the resulting differences are greater than 32, the algorithm then examines the two most significant bits. This is accomplished, as shown in block 207, when the differences between the pixel values are examined to determine if they are less than 64. If yes, the codeword is generated, in block 208, as the six most significant bits of the base value $P_0$, followed by bits 2 through 6 of the differences between pixels $P_0$ and $P_1$, $P_1$ and $P_2$, $P_2$ and $P_3$, followed by three trailing tag bits "100".

If, in block 207, the resulting differences are greater than 64, the worst case has been identified, and in blocks 209 and 211, the algorithm then forms the codeword using the four most significant bits of pixel value $P_0$, followed by bits 3 through 7 of the differences between $P_0$ and $P_1$, $P_1$ and $P_2$, $P_2$ and $P_3$, followed by the sum of the two least significant bits, bit 0 and bit 1, of values $P_0$, $P_1$, $P_2$, and $P_3$, followed by three trailing tag bits "000".

In sum, compression according to the invention can be performed by a method including the steps of accessing and selecting a plurality of pixels, identifying a first pixel and a second pixel in the plurality of pixels, determining a first difference between a value for the first pixel and a value for the second pixel, comparing the difference with a threshold, and storing a codeword responsive to the difference and a result of the comparison. Preferably, the storing step includes storing exact values (i.e., all bits) for the first value and for the difference when the difference is less than the selected threshold, and storing approximate values (i.e., less than all bits) when the difference is greater than the selected threshold. The steps of the method can be expanded for application to more than a first and second pixel, for example four pixels at a time as discussed above.

This method is performed for all pixel values representing the four pixel groups in succession in any order desired. Its embodiment herein is unique in its efficiency and simplicity as well as its ability to perform random access to compressed pixels.

The embodiment described herein typically follows the decoding of a formatted signal such as MPEG 1 or MPEG 2. Thus, I, B and P frames within the MPEG signal are decoded into raw picture data, compressed into DRAM or other video memory using the method described in this application, then decompressed for display on the view screen. In particular, the embodiment described herein provides particularly good random access to pixels by compressing very small blocks i.e. four pixels at a time. Furthermore, the embodiment described herein is particularly suited to interlaced video and allows for example, every third or fourth line to be displayed. Hence, scalability of output is enabled fast, simply and with the minimum logic. Therefore, this embodiment allows flexibility of display in for example, a VGA environment as well as in a TV environment.

In one embodiment, compression according to the invention is performed by an MPEG decoder after that decoder decodes an MPEG formatted signal.

The following pseudocode also describes operation of the method of compression:

Case 1
Calculate:
  $D_{01}[7:0]=P_0[7:0]-P_1[7:0]$,
  $D_{12}[7:0]=P_1[7:0]-P_2[7:0]$
  $D_{23}[7:0]=P_2[7:0]-P_3[7:0]$
If $D_{01}[7:5]==D_{01}[4],D_{01}[4], D_{01}[4])\&\&(D_{12}[7:5]==D_{12}[4]$,
  $D_{12}[4], D_{12}[4])\&\&(D_{23}[7:5]==D_{23}[4],D_{23}[4],D_{23}[4])$
Then
  Codeword[23:0]=($P_1[7:0],D_{01}[4:0],D_{12}[4:0],D_{23}[4:0]$,
    1'b1).
Case 2
Set:
  $PP_0[6:0]=P_0[7:1]$,
  $PP_1[6:0]=P_1[7:1]$, $PP_2[6:0]=P_2[7:1]$, and
$PP_3[6:0]=P_3[7:1]$.
Calculate:
$DD_{01}[6:0]=PP_0[6:0]-PP_1[6:0]$,
$DD_{12}[6:0]=PP_1[6:0]-PP_2[6:0]$,
$DD_{23}[6:0]=PP_2[6:0]-PP_3[6:0]$,
If $(DD_{01}[6:5]==DD_{01}[4],DD_{01}[4])\&\&(DD_{12}[6:5]==DD_{12}[4],DD_{12}[4]\&\&(DD_{23}[6:5]==DD_{23}[4],DD_{23}[4])$
Then
  $Codeword[23,0]=(PP_1[6:0],DD_{01}[4:0],DD_{12}[4:0],DD_{23}[4:0],2\text{'}b10)$.
Case 3
Set:
  $PPP_0[5:0]=P_0[7:2]$,
  $PPP_1[5:0]=P_1[7:2]$,
  $PPP_2[5:0]=P_2[7:2]$, and
  $PPP_3[5:0]=P_3[7:2]$.
Calculate:
  $DDD_{01}[5:0]=PPP_0[6:0]-PPP_1[6:0]$,
  $DDD_{12}[5:0]=PPP_1[6:0]-PPP_2[6:0]$,
  $DDD_{23}[5:0]=PPP_2[6:0]-PPP_3[6:0]$,
If $(DDD_{01}[5]==DDD_{01}[4])\&\&(DDD_{12}[5]==DDD_{12}[4])\&\&(DDD_{23}[5]==(DD_{23}[4])$,
then
  $Codeword[23,0]=(PPP_1[5:0],DDD_{01}[4,0],DDD_{12}[4,0],DDD_{23}[4,0],3\text{'}b100)$.
Case 4
Set:
  $PPPP_0[4:0]=P_0[7:3]$,
  $PPPP_1[4:0]=P_1[7:3]$,
  $PPPP_2[4:0]=P_2[7:3]$, and
  $PPPP_3[4:0]=P_3[7:3]$.
Calculate:
  $DDDD_{01}[4:0]=PPPP_0[4:0]-PPPP_1[4:0]$,
  $DDDD_{12}[4:0]=PPPP_1[4:0]-PPPP_2[4:0]$,
  $DDDD_{23}[4:0]=PPPP_2[4:0]-PPPP_3[4:0]$,
  $R[4:0]=\{2\text{'}b00,P_0[2:0]\}+\{2\text{'}b00,P_1[2:0]\}+\{2\text{'}b00,P_2[2:0]\}+\{2\text{'}b00\}, P_{3[2:0]}\}$
Then
  $Codeword[23,0]=(PPPP_1[4:0],DDDD_{01}[4:0],DDDD_{12}[4:0],DDDD_{23}[4:0],R[4],3\text{'}b000)$ In order to expand the compressed file for display, the trailing tag bits for each block of pixel values is examined to determine what degree of compression was applied to that block. Once the degree of compression is determined, the compression process which applied for that particular case may be reversed, and the values restored to viewable form.

Alternative Embodiments

Although preferred embodiments are disclosed herein, many variations are possible which remain within the concept, scope, and spirit of the invention, and these variations would become clear to those skilled in the art after perusal of this application.

I claim:

1. A method of compressing pixel data, said method including the steps of:
   identifying a first pixel and a second pixel in a plurality of pixels;
   determining a difference between a first value for said first pixel and a second value for said second pixel;
   storing a codeword including exact values for said first value and for said difference when said difference is less than a selected threshold; and
   storing a codeword including approximate values for said first value and for said difference when said difference is greater than said threshold, said approximate values being quantized to a degree responsive to said difference;
   wherein at least one said approximate value is quantized to a degree proportionate to a ratio of said difference to said threshold.

2. A method as in claim 1, further including the step of storing tag information indicating a degree of quantization for said approximate values.

3. A method as in claim 1, wherein the plurality of pixels are obtained by randomly accessing and selecting the plurality of pixels from the pixel data.

4. A method as in claim 1, further including the step of performing MPEG decoding before the identifying step.

5. A method of compressing pixel data, said method including the steps of:
   identifying a first pixel and a second pixel in a plurality of pixels;
   determining a difference between a first value for said first pixel and a second value for said second pixel;
   storing a codeword including exact values for said first value and for said difference when said difference is less than a selected threshold; and
   storing a codeword including approximate values for said first value and for said difference when said difference is greater than said threshold, said approximate values being quantized to a degree responsive to said difference;
   wherein said at least one approximate value is quantized to a nearest value divisible by two when said difference is less than twice said threshold.

6. A method as in claim 5, further including the step of storing tag information indicating a degree of quantization for said approximate values.

7. A method as in claim 5, wherein the plurality of pixels are obtained by randomly accessing and selecting the plurality of pixels from the pixel data.

8. A method as in claim 5, further including the step of performing MPEG decoding before the identifying step.

9. A method of compressing pixel data, said method including the steps of:
   identifying a first pixel and a second pixel in a plurality of pixels;
   determining a difference between a first value for said first pixel and a second value for said second pixel;
   storing a codeword including exact values for said first value and for said difference when said difference is less than a selected threshold; and
   storing a codeword including approximate values for said first value and for said difference when said difference is greater than said threshold, said approximate values being quantized to a degree responsive to said difference; wherein
     at least one said approximate value is quantized to a nearest value divisible by two when said difference is less than twice said threshold; and
     at least one said approximate value is quantized to a nearest value divisible by four when said difference is less than four times said threshold.

10. A method as in claim 9, further including the step of storing tag information indicating a degree of quantization for said approximate values.

11. A method as in claim 9, wherein the plurality of pixels are obtained by randomly accessing and selecting the plurality of pixels from the pixel data.

12. A method as in claim 9, further including the step of performing MPEG decoding before the identifying step.

13. A method of compressing pixel data, said method including the steps of:
- identifying a first pixel and a second pixel in a plurality of pixels;
- determining a difference between a first value for said first pixel and a second value for said second pixel;
- storing a codeword including exact values for said first value and for said difference when said difference is less than a selected threshold; and
- storing a codeword including approximate values for said first value and for said difference when said difference is greater than said threshold, said approximate values being quantized to a degree responsive to said difference; wherein
  - at least one said approximate value is quantized to a nearest value divisible by two when said difference is less than twice said threshold;
  - at least one said approximate value is quantized to a nearest value divisible by four when said difference is less than four times said threshold; and
  - at least one said approximate value is quantized to a nearest value divisible by eight when said difference is at least four times said threshold.

14. A method as in claim 13, further including the step of storing tag information indicating a degree of quantization for said approximate values.

15. A method as in claim 13, wherein the plurality of pixels are obtained by randomly accessing and selecting the plurality of pixels from the pixel data.

16. A method as in claim 13, further including the step of performing MPEG decoding before the identifying step.

17. A memory including compressed pixel data for a compact block of pixels, said compressed pixel data including a plurality of codewords, each said codeword including:
- a first value representing a first absolute value for a first pixel; and
- a second value representing a difference between said first absolute value and a second absolute value for a second pixel;
- said first value and said second value including all bits of said first absolute value and said difference when said difference is less than a selected threshold, and including less than all bits of said first absolute value and said difference when said difference is more than said threshold;
- wherein said first value and said second value are quantized to a degree proportionate to a ratio of said difference to said threshold.

18. A memory as in claim 17, wherein said codeword further includes a tag indicating a degree of quantization for said approximate values.

19. A memory including compressed pixel data for a compact block of pixels, said compressed pixel data including a plurality of codewords, each said codeword including:
- a first value representing a first absolute value for a first pixel; and
- a second value representing a difference between said first absolute value and a second absolute value for a second pixel;
- said first value and said second value including all bits of said first absolute value and said difference when said difference is less than a selected threshold, and including less than all bits of said first absolute value and said difference when said difference is more than said threshold;
- wherein said first value and said second value are quantized to a nearest value divisible by two when said difference is less than twice said threshold.

20. A memory as in claim 19, wherein said codeword further includes a tag indicating a degree of quantization for said approximate values.

21. A memory including compressed pixel data for a compact block of pixels, said compressed pixel data including a plurality of codewords, each said codeword including:
- a first value representing a first absolute value for a first pixel; and
- a second value representing a difference between said first absolute value and a second absolute value for a second pixel;
- said first value and said second value being exact when said difference is less than a selected threshold, and being approximate when said difference is more than said threshold; wherein
  - said first value and said second value are quantized to a nearest value divisible by two when said difference is less than twice said threshold; and
  - said first value and said second value are quantized to a nearest value divisible by four when said difference is less than four times said threshold.

22. A memory as in claim 21, wherein said codeword further includes a tag indicating a degree of quantization for said approximate values.

23. A memory including compressed pixel data for a compact block of pixels, said compressed pixel data including a plurality of codewords, each said codeword including:
- a first value representing a first absolute value for a first pixel; and
- a second value representing a difference between said first absolute value and a second absolute value for a second pixel;
- said first value and said second value being exact when said difference is less than a selected threshold, and being approximate when said difference is more than said threshold; wherein
  - said first value and said second value are quantized to a nearest value divisible by two when said difference is less than twice said threshold;
  - said first value and said second value are quantized to a nearest value divisible by four when said difference is less than four times said threshold; and
  - said first value and said second value are quantized to a nearest value divisible by four when said difference is at least four times said threshold.

24. A memory as in claim 23, wherein said codeword further includes a tag indicating a degree of quantization for said approximate values.

25. An apparatus that performs compression of data, comprising digital signal processing circuits adapted to perform steps including:
- identifying a first pixel and a second pixel in a plurality of pixels;
- determining a difference between a first value for said first pixel and a second value for said second pixel;
- storing a codeword including exact values for said first value and for said difference when said difference is less than a selected threshold; and
- storing a codeword including approximate values for said first value and for said difference when said difference is greater than said threshold, said approximate values being quantized to a degree responsive to said difference;

wherein at least one said approximate value is quantized to a degree proportionate to a ratio of said difference to said threshold.

26. An apparatus as in claim 25, wherein said steps further include storing tag information indicating a degree of quantization for said approximate values.

27. An apparatus as in claim 25, wherein the plurality of pixels are obtained by randomly accessing and selecting the plurality of pixels from the pixel data.

28. An apparatus as in claim 25, wherein said steps further include performing MPEG decoding before the identifying step.

29. An apparatus that performs compression of data, comprising digital signal processing circuits adapted to perform steps including:

identifying a first pixel and a second pixel in a plurality of pixels;

determining a difference between a first value for said first pixel and a second value for said second pixel;

storing a codeword including exact values for said first value and for said difference when said difference is less than a selected threshold; and storing a codeword including approximate values for said first value and for said difference when said difference is greater than said threshold, said approximate values being quantized to a degree responsive to said difference;

wherein said at least one approximate value is quantized to a nearest value divisible by two when said difference is less than twice said threshold.

30. An apparatus as in claim 29, wherein said steps further include storing tag information indicating a degree of quantization for said approximate values.

31. An apparatus as in claim 29, wherein the plurality of pixels are obtained by randomly accessing and selecting the plurality of pixels from the pixel data.

32. An apparatus as in claim 29, wherein said steps further include performing MPEG decoding before the identifying step.

33. An apparatus that performs compression of data, comprising digital signal processing circuits adapted to perform steps including:

identifying a first pixel and a second pixel in a plurality of pixels;

determining a difference between a first value for said first pixel and a second value for said second pixel;

storing a codeword including exact values for said first value and for said difference when said difference is less than a selected threshold; and storing a codeword including approximate values for said first value and for said difference when said difference is greater than said threshold, said approximate values being quantized to a degree responsive to said difference; wherein at least one said approximate value is quantized to a nearest value divisible by two when said difference is less than twice said threshold; and at least one said approximate value is quantized to a nearest value divisible by four when said difference is less than four times said threshold.

34. An apparatus as in claim 33, wherein said steps further include storing tag information indicating a degree of quantization for said approximate values.

35. An apparatus as in claim 33, wherein the plurality of pixels are obtained by randomly accessing and selecting the plurality of pixels from the pixel data.

36. An apparatus as in claim 33, wherein said steps further include performing MPEG decoding before the identifying step.

37. An apparatus that performs compression of data, comprising digital signal processing circuits adapted to perform steps including:

identifying a first pixel and a second pixel in a plurality of pixels;

determining a difference between a first value for said first pixel and a second value for said second pixel;

storing a codeword including exact values for said first value and for said difference when said difference is less than a selected threshold; and storing a codeword including approximate values for said first value and for said difference when said difference is greater than said threshold, said approximate values being quantized to a degree responsive to said difference; wherein at least one said approximate value is quantized to a nearest value divisible by two when said difference is less than twice said threshold;

at least one said approximate value is quantized to a nearest value divisible by four when said difference is less than four times said threshold; and at least one said approximate value is quantized to a nearest value divisible by eight when said difference is at least four times said threshold.

38. An apparatus as in claim 37, wherein said steps further include storing tag information indicating a degree of quantization for said approximate values.

39. An apparatus as in claim 37, wherein the plurality of pixels are obtained by randomly accessing and selecting the plurality of pixels from the pixel data.

40. An apparatus as in claim 37, wherein said steps further include performing MPEG decoding before the identifying step.

* * * * *